United States Patent
Gao et al.

(10) Patent No.: US 11,232,111 B2
(45) Date of Patent: Jan. 25, 2022

(54) AUTOMATED COMPANY MATCHING

(71) Applicant: ZoomInfo Apollo LLC, Vancouver, WA (US)

(72) Inventors: Hua Gao, Sunnyvale, CA (US); Amit Rai, Danville, CA (US)

(73) Assignee: ZoomInfo Apollo LLC, Vancouver, WA (US)

( * ) Notice: Subject to any disclaimer, the term of this patent is extended or adjusted under 35 U.S.C. 154(b) by 0 days.

(21) Appl. No.: 16/847,832

(22) Filed: Apr. 14, 2020

(65) Prior Publication Data

US 2020/0327136 A1 Oct. 15, 2020

Related U.S. Application Data (60) Provisional application No. 62/833,735, filed on Apr. 14, 2019.

(51) Int. Cl.
| | |
|---|---|
| *G06F 16/2457* | (2019.01) |
| *G06N 5/04* | (2006.01) |
| *G06Q 10/06* | (2012.01) |
| *G06F 40/295* | (2020.01) |

(52) U.S. Cl.
CPC ...... *G06F 16/24578* (2019.01); *G06F 40/295* (2020.01); *G06N 5/04* (2013.01); *G06Q 10/06* (2013.01)

(58) Field of Classification Search
CPC ... G06F 16/24578; G06F 40/295; G06N 5/04; G06Q 10/06
See application file for complete search history.

(56) References Cited

U.S. PATENT DOCUMENTS

| | | |
|---|---|---|
| 7,043,531 B1 | 5/2006 | Seibel et al. |
| 9,202,227 B2 | 12/2015 | Kahlow |
| 2006/0129975 A1 | 6/2006 | Wille et al. |
| 2007/0299743 A1 | 12/2007 | Staib et al. |
| 2008/0086343 A1 | 4/2008 | Pendergraft et al. |
| 2008/0086363 A1 | 4/2008 | Kass et al. |
| 2008/0288889 A1 | 11/2008 | Hunt et al. |
| 2010/0262550 A1 | 10/2010 | Burritt et al. |
| 2011/0093452 A1 | 4/2011 | Jain |

(Continued)

OTHER PUBLICATIONS

Feature-Based recommendations for one-to-one marketing. Sung-Shun Weng. Mei-Ju Liu. Expert Systems with Applications, vol. 26, Issue 4. May 2004. (Year: 2004).

*Primary Examiner* — Truong V Vo
(74) *Attorney, Agent, or Firm* — Lane Powell PC (57) ABSTRACT

An automated predictive analytics system disclosed herein provides a novel technique for industry classification. In one implementation, the analytic system provides a method of matching company names, the method including generating a provider-side company dataset, for each record in a client's company records, identify a list of match candidates from the provider-side company dataset that has overlapping company signature fragments, for each client-side company, compute match scores against the list of provider-side match candidates on each signature fragment and form an overall match score, for each client-side company, use the match scores to rank candidates and keep a predetermined number of top predetermined matches, and display the predetermined number of top predetermined matches using a user interface.

14 Claims, 5 Drawing Sheets

(56) References Cited

U.S. PATENT DOCUMENTS

| | | |
|---|---|---|
| 2011/0213655 A1 | 9/2011 | Henkin et al. |
| 2012/0089497 A1 | 4/2012 | Taylor et al. |
| 2012/0137367 A1 | 5/2012 | Dupont et al. |
| 2012/0203584 A1 | 8/2012 | Mishor et al. |
| 2013/0031018 A1 | 1/2013 | Jellum |
| 2015/0046219 A1 | 2/2015 | Shavlik |
| 2015/0095349 A1* | 4/2015 | Sturzoiu ........... G06F 16/24578 707/748 |
| 2015/0379602 A1 | 12/2015 | Gupta et al. |
| 2016/0048854 A1 | 2/2016 | Kahlow |
| 2017/0109344 A1 | 4/2017 | Shmueli |
| 2019/0236085 A1* | 8/2019 | Galitsky ................. G10L 15/08 |

* cited by examiner

AUTOMATED COMPANY MATCHING

CROSS-REFERENCE TO RELATED APPLICATIONS

This patent application is a non-provisional patent application based on U.S. provisional patent application Ser. No. 62/833,735 filed on 14 Apr. 2019 entitled "Automated Company Matching," which is incorporated by reference herein in its entirety.

FIELD

Implementations disclosed herein relate, in general, to information management technology and specifically to predictive analytics technology.

BACKGROUND

A company entity is represented by a signature that consists of the Company Name, Address, Website, and Phone number. The automated company matching system disclosed herein maintains and curates a database of hundreds of millions of company signatures. Customers also have their own database of company records, e.g. in customer relationship management (CRM) systems, marketing automation systems, their own databases, or even spreadsheets. In order for our customers to extract value from our company database and all of the attributes and information within, a user has to first link our client's records with our own. This involves comparing the company signatures from the client's data set against our database of company signatures and finding the best match.

There are numerous challenges that exist for such a system. The first is the sheer scale of computation needed for comparing one database of millions of records against another database of hundreds of millions of records. To find the best match in a naïve implementation, each record from one database has to be compared against each record from the other, leading to a pairwise and quadratic scaling of computational complexity (number of records in database 1×number of records in database 2). Another challenge is that big datasets are often noisy, containing wrong, outdated, or missing values. Even when values exist, there may be variations in the company name, addresses, and other fields.

SUMMARY

An automated predictive analytics system disclosed herein provides a novel technique for industry classification. In one implementation, the analytic system provides a method of matching company names, the method including generating a provider-side company dataset, for each record in a client's company records, identify a list of match candidates from the provider-side company dataset that has overlapping company signature fragments, for each client-side company, compute match scores against the list of provider-side match candidates on each signature fragment and form an overall match score, for each client-side company, use the match scores to rank candidates and keep a predetermined number of top predetermined matches, and display the predetermined number of top predetermined matches using a user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein

BRIEF DESCRIPTION OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTION

To scale up the computation, the company matching system disclosed herein formulate the processing algorithm such that it may be executed on a cluster of servers, e.g. using Apache Hadoop for cluster and distributed filesystem management and MapReduce or Apache Spark as distributed computing frameworks. The general idea behind distributed computing is to break up the big datasets and computation into smaller partitions which may be independently and concurrently executed by each worker in the cluster. This is sometimes called the "Map" step. Another typical operation in distributed computing is to perform some computation over a group of records which share a common key. This requires the records with the same key to be transferred or "shuffled" over the network to the same worker, so that the computation may be performed on the group of all records with the same key. This is sometimes called the "Reduce" step. A third typical operation is to "broadcast" a common reference dataset such that each worker in the cluster has a full copy of it; this is in contrast to the distributed, partitioned datasets where each worker only operates on a subset of the data which is local to that worker.

Figure 1:
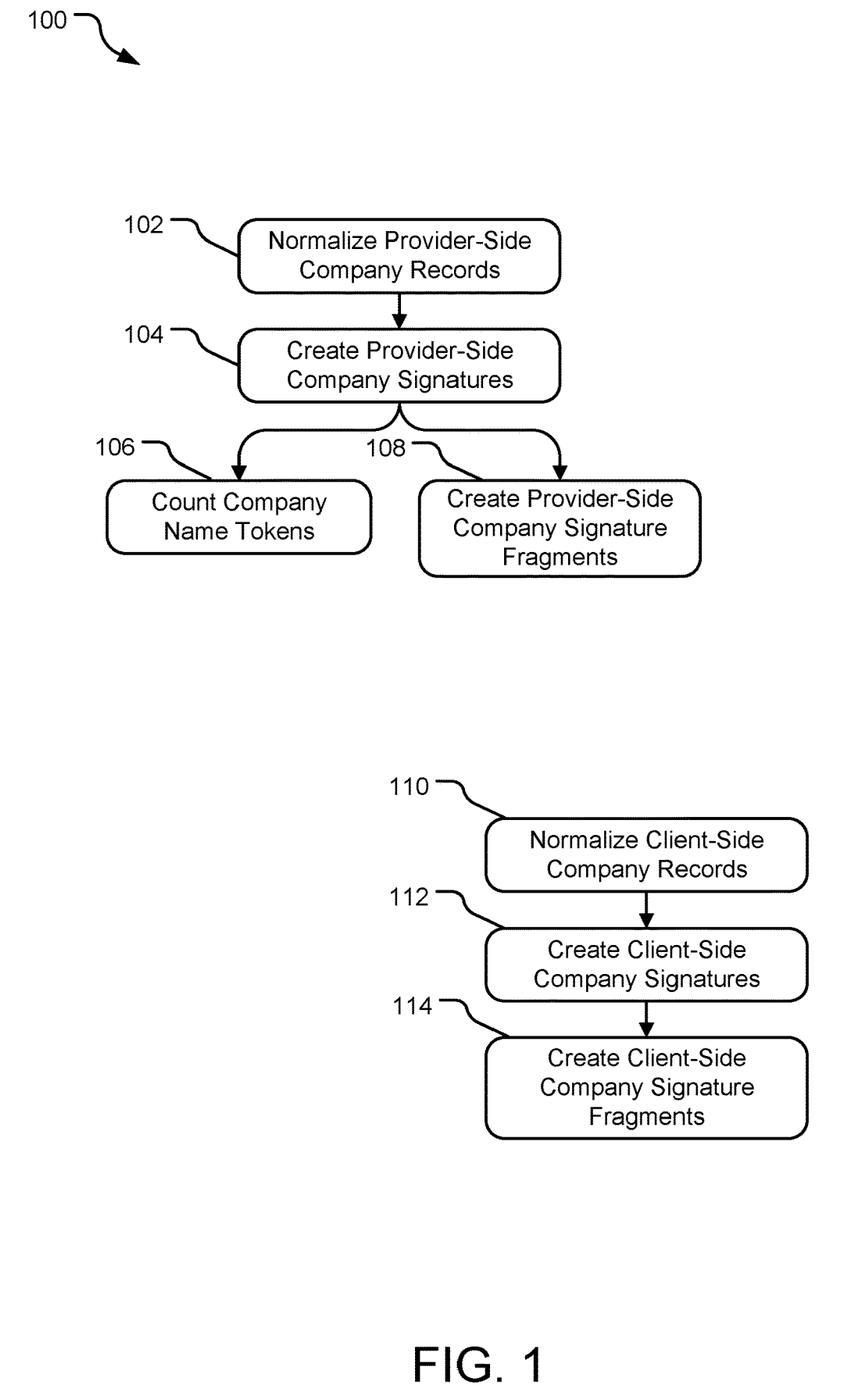
FIG. 1 illustrates example operations for preparing a database of Provider-side match candidates for generating company match results.

FIG. 1 illustrates operations 100 for preparing the data for generating company matching.

Creating the Company Signatures

Specifically, operations 102-104 disclose creating Provider-side company signature fragments and operations 110-114 disclose creating Client-side company signature fragments.

To create the company signatures, the four fields of name, address, website, and phone number are normalized or relaxed to reduce the variations that may exist in each field. For company name, the business type designation, e.g. Inc, Co, Corp, LLC, LLP, etc., if found in either abbreviated or unabbreviated form, is removed and tracked separately. A relaxed version of name is created by lowercasing the rest of the name, removing non-alphanumeric symbols, expanding common abbreviations (e.g. "mfg" to "manufacturing"), and removing leading articles (e.g. "the", "a", "an"). For example, "The Walt Disney Company" would have a relaxed name of "wait disney" and a business type of "Co".

Addresses are parsed into constituent components using a suitable machine learning model trained for the task. The constituent components include building name, building number, road name, road type, directional, suite or unit number, city, state, postcode and country. These components are also normalized. Some of these normalizations are as follows. Road name words are normalized by lowercasing, replacing certain abbreviations, and standardizing numerics that may be spelled out, e.g. "Fifth" vs "5th" or "1" vs "One". Road types are reduced to standard abbreviations, e.g. "Street" to "St", "Boulevard" to "Blvd", "Avenue" to "Ave", and so forth. Directionals are reduced to single or two-letter abbreviations, e.g. "East" to "E" and "Northwest" to "NW". Units and suites are also reduced to standard abbreviations, e.g. "Suite" to "Ste", "Floor" to "Fl", and so on, and the unit value is parsed and tracked separately, e.g. "400A" in "Suite 400A". City, state, and country values are expanded from common abbreviations, e.g. "NY" to "New York", and alternate forms are replaced with canonical forms, e.g. "Vietnam" to "Viet Nam", "Macau" to "Macao", and so forth. Postcodes are normalized for spacing and formatting according to the norms of each country. Finally, in case of partially filled addresses, the missing values are filled in wherever there is enough disambiguating information available, e.g. a missing city or state may be inferred and filled in from a given postcode, and sometimes vice versa.

Website URLs are parsed into subdomain, domain, and path components. The representative website is typically the subdomain and domain, which corresponds to a corporate or brand website. In other cases where the company chooses to use a hosted page, e.g. a Facebook page or a Yelp page, the path component is also kept since they would otherwise share the same subdomain and domain as the other hosted pages.

Phone and fax numbers are parsed into country code, area code, and phone number components, and then represented using the standard international E.164 formatting.

Creating Signature Fragments

Even with the normalizations described in the previous section, there are still other variations that may exist in a client's database of company records versus our company records, particularly with incomplete data, partial or shorthand naming, or typographical errors. For example, the company name collected or entered by a salesperson may be in a colloquial form rather than the legal entity name. In other situations, the company name may be collected over the phone, in which case there may be an incorrect but phonetically similar entry for that record. Therefore, to increase the chance of finding the correct company record, the company matching system allows partial matching of signature components.

To facilitate the partial matching, the company matching system creates and associates fragments of the company signature with each company record. A signature fragment may be a word token or substring, or a combination of several word tokens or substrings from the company name, address, website, or phone number. Some examples of fragment types are:

Individual words from the company name
Individual words from the address components, such as city or state
The postcode
The website or domain
The resolved website or domain if there is a redirect
The phone number
The combination of building number (from the address) and a word from the road name
The combination of a word from the company name and a word from the road name
The combination of a word from the company name and a word from the city
The phonetic representation of a word, e.g. using Soundex, Metaphone, Double Metaphone or other phonetic keying methods, in the name or address components, and combinations thereof
The k-length character sequence sub strings of each word in the company name
A representative hashcode of name or address components, using standard or locality-sensitive hashing techniques
A representative hashcode of the website page contents, using standard or locality-sensitive hashing techniques
And so forth For each company record, there is a list of signature fragments that essentially serve as an index to point back to that company.

For each signature fragment, the company matching system also counts the number of company records that exhibit the fragment. The counts indicate the number of potential match candidates for any given signature fragment. Signature fragments that have very high count may be filtered out since they are not very unique identifying features and will produce too many candidates for matching, reducing downstream computational efficiency.

Counting Company Name Tokens

For each word that appears in the company names, the company matching system counts the number of company names that contain that word. This count is a document frequency that indicates how uniquely identifying that name token is.

Creating the Client's Company Signatures

When onboarding a client, their accounts or company records data, e.g. from their CRM systems, are ingested into the company matching system. From these records, the corresponding company signatures and signature fragments are created using the same procedure as when creating company signatures and signature fragments of provider's records.

Figure 2:
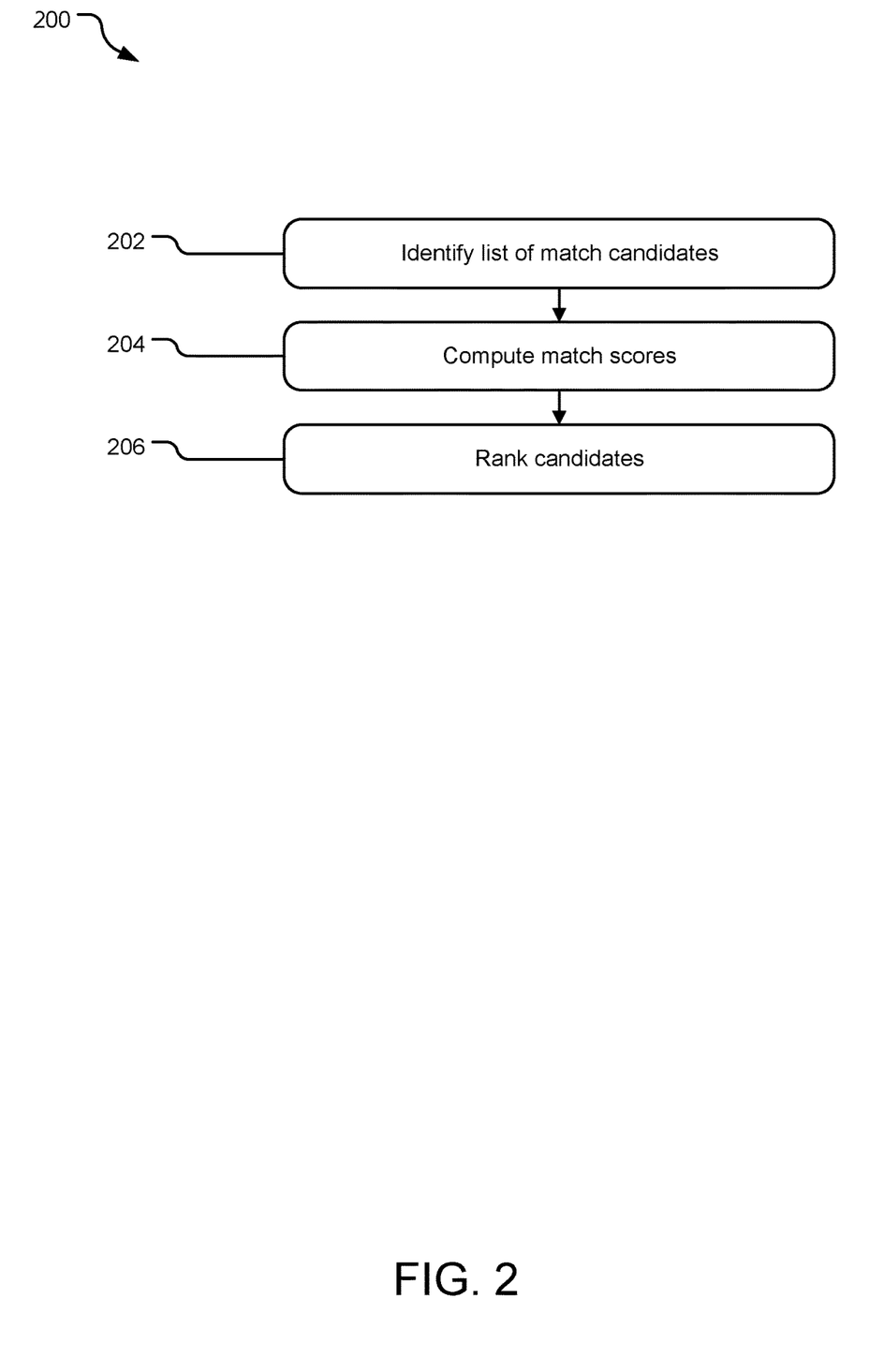
FIG. 2 illustrates example operations for high level company matching.

FIG. 2 illustrates operations 200 for high level company matching.

202. For each record in a client's company records, identify the list of match candidates from Provider companies that have overlapping company signature fragments.

204. For each Client-side company, compute match scores against the list of Provider-side match candidates on each signature component and form an overall match score.

206. For each Client-side company, use the match scores to rank candidates and keep the top k matches.

Figure 3:
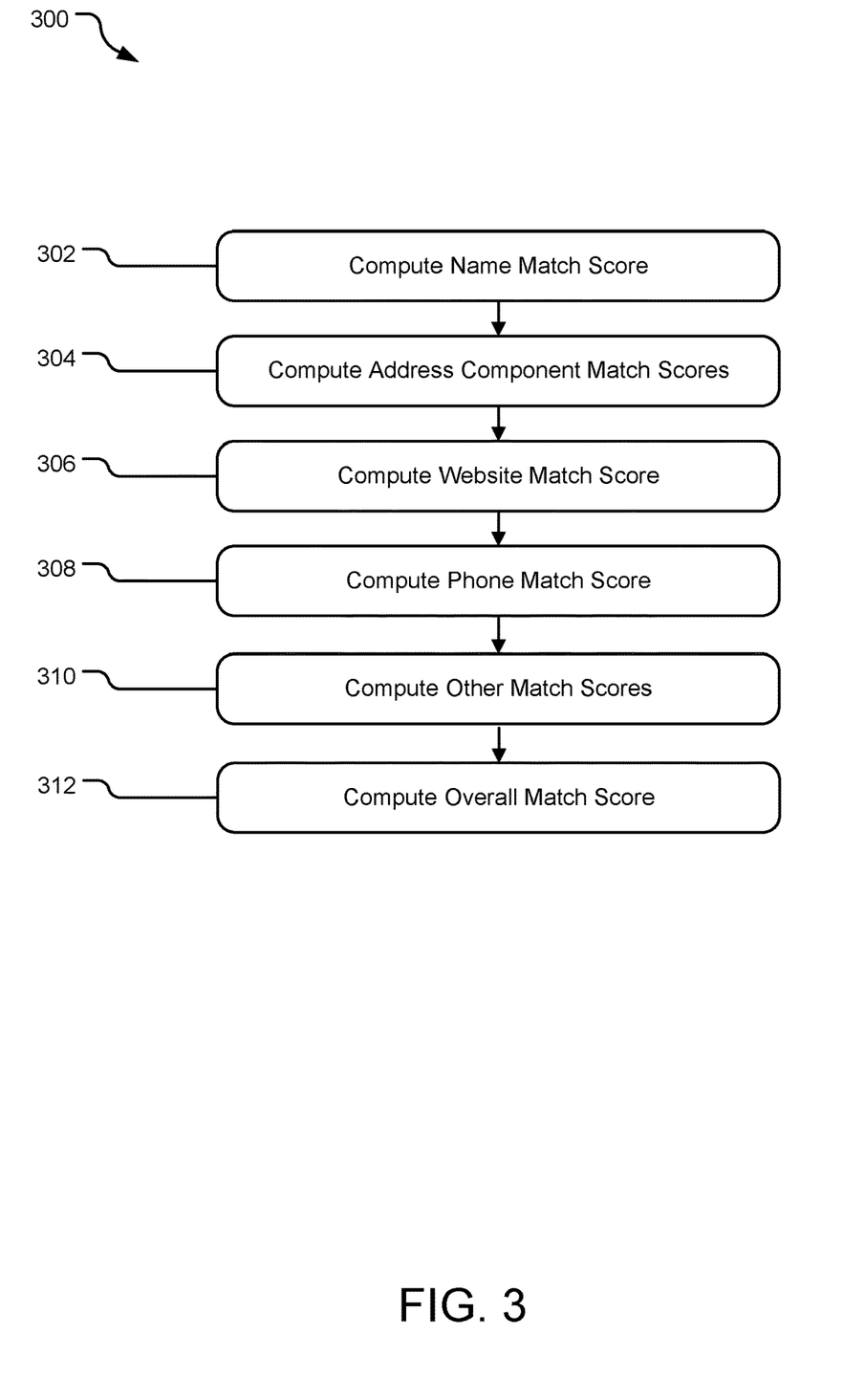
FIG. 3 illustrates example operations for computing various matching scores.

FIG. 3 illustrates operations 300 for computing various matching scores.

302: Computing Match Scores

For each pair of a Client-side company and a Provider-side company match candidate, the company matching system can compute match scores on the various components of the company signatures. Match scores are computed for each component, including:

Relaxed name
Business type
Phone number
Webpage
Building name
Building number

Road name
Road type
Directional
Unit/Suite
City
State
Postcode
Country

Match scores can be computed using a variety of techniques. One basic similarity measure for comparing two strings is Levenshtein distance, which counts the minimum number of character edits required to transform one string into the other. The possible character edits are insertions, deletions, and replacements. In more sophisticated implementations of Levenshtein distance, each edit may be weighted based on importance of the characters being changed. For example, edits between 'a' and 'e' may be penalized less because they are phonetically similar, or insertions and deletions of 'x' may be penalized more because 'x' is typically rarer and uniquely identifying than other letters. Even though Levenshtein edits is a distance measure, a corresponding similarity measure may be formed since distance and similarity are inversely related. Other basic string similarity measures are Longest Common Substring, which measures the longest substring that is common to both strings being compared, and Longest Common Subsequence, which measures the longest sequence of characters, allowing for character skips, that is common to both strings being compared.

Another method to compute similarity between two strings is to represent each string as a vector, and then use a vector similarity or distance measure, such as cosine similarity or Euclidean distance. The vector representation can follow a bag-of-words format, where each dimension of the vector corresponds to the strength of a specific word (or character or ngram sequence of words), typically in the form of the word count or TF-IDF value. TF-IDF stands for Term Frequency-Inverse Document Frequency, which is a weighting technique that is proportional to the count of a word (term frequency) in a string, and inversely proportional to the occurrences of the word in the corpus of all documents or strings (document frequency). One example TF-IDF weighting for word t is $$tfidf(t) = \text{term frequency}(t) \times \log\left(1 + \frac{N_{doc}}{\text{document frequency}(t)}\right)$$

The intuition is that words that appear more often in a document should be proportionally stronger in the vector representation, but words that appear in many documents should be weaker since they are a less distinguishing feature.

Other techniques can also be used to create semantic vector representations of words, including, but not limited to, Word2Vec, GloVe vectors, and factorization of the positive pointwise mutual information (PPMI) matrix of words and their co-occurring context or neighboring words. These individual word vectors can be combined using various methods, e.g. weighted average, to form one vector for a phrase or string of words. These techniques embed semantic information of each word into a dense vector, whereas the bag-of-words techniques can be interpreted to represent each word as a one-hot encoded vector, i.e. only one dimension is nonzero. In the former case, word-to-word similarity can be established by using a vector similarity measure, e.g. cosine similarity, on the dense word embedding vectors, whereas in the latter case, similarity is only nonzero when there are exact matches on the word.

For address related fields, in addition to string similarity methods, the company matching system can also use geospatial distances as a direct distance measure. For example, the company matching system can map addresses to longitude and latitude coordinates, and compute physical distance between any two addresses.

302-312: Generalized Match Scoring

For comparing string phrases, such as company relaxed names, the company matching system implements a technique that takes into consideration both the importance of the individual words that make up the phrases, as well as the similarity between words in the case of inexact match, in essence allowing for fuzziness.

Let $str_c$ be the given client-side string value, such as relaxed name, and $t_c^i$ for $i \in \{1, 2, \ldots, n_c\}$ be the word tokens in $str_c$ where $n_c$ is the number of words in $str_c$.

Similarly, let $str_e$ be the given Provider-side string value, and $t_e^j$ for $j \in \{1, 2, \ldots, n_e\}$ be the word tokens in $str_e$ where $n_e$ is the number of words in $str_e$.

Let $w_c(t)$ and $w_e(t)$ be the weight functions for a token t in $str_c$ and $str_e$, respectively, indicating the importance of that word in the string.

Let $s(t_1, t_2)$ be a similarity scoring function for $t_1$ that scores how similar token $t_2$ is to $t_1$. Note that $s(t_1, t_2)$ does not necessarily have to equal $s(t_2, t_1)$ since the reference token is different.

Let $$\text{score}(t_c^i, t_e^j) = s(t_c^i, t_e^i) \times w_c(t_c^i) \times s(t_e^j, t_c^i) \times w_e(t_e^j)$$

be the token match score for a pair of a Client-side token and a Provider-side token. This essentially allows for "partial credit" based on the similarity score when there is an inexact match.

Finally, define the overall string match score to be $$\max_{p \in P} \sum_{(i,j) \in p} \text{score}(t_c^i, t_e^j)$$

where P are the sets of pairs (i,j) where $i \in \{1, 2, \ldots, n_c\}$, $j \in \{1, 2, \ldots, n_e\}$, and i and j are used at most once.

In other words, the overall string match score is the maximum possible sum of token match scores such that each Client-side token or Provider-side token is used at most once. This can be computed as follows. Compute the token match scores for all pairwise combinations of a Client-side token and a Provider-side token. Sort the token match scores and token pairs from highest score to lowest score. Initialize an overall score accumulator to 0 and track the set of Client-side tokens that have not been used yet, and the set of Provider-side tokens that have not been used yet. For each token pair, starting from the highest scoring pair, add the token match score to the overall score accumulator and update the tracked sets of unused tokens if both Client-side token and Provider-side token have not been used yet, else skip the pair and move on to the next highest scoring pair. Continue until one or both sides of tokens have been exhausted.

If the similarity scoring function ranges from 0 to 1 and the weighting functions are normalized over all tokens in the string, then this technique may be interpreted to be a cosine similarity between two vector representations, because score $(t_c^i, t_e^j)$ is a multiplication over two comparable components, and then the sum over component multiplications behaves as a dot product operation. And of course, cosine similarity is equivalent to the dot product of two unit-length normalized vectors. However, the difference of this technique is that the component multiplications do not need to happen on exactly matching components, but rather on fuzzily matched components through the similarity function.

302: Company Relaxed Name Match Score

In scoring the company relaxed name matches, the string values $str_c$ and $str_e$ are the Client-side company relaxed name and Provider-side company relaxed name.

One possible weighting scheme for $w_c(t)$ and $w_e(t)$ is the inverse document frequency L2-normalized over all words in the relaxed name. Let $$idf(t) = \log\left(1 + \frac{N_{doc}}{\text{document frequency}(t)}\right)$$

be the inverse document frequency of word t, where the document frequency of word t is previously computed by counting the number of company names that contain t. Then $$w_e(t_e^i) = \frac{idf(t_c^i)}{\sqrt{\sum_{i=1}^{n_c}(idf(t_c^i))^2}}$$

In an alternate implementation of weighting scheme, instead of considering individual words, the company matching system may aggregate counts of each word in the name and use TF-IDF weighting. In this case, $t_c^i$ and $t_e^j$ to are unique over i and j, respectively, and $n_c$ and $n_e$ become the number of unique words in the Client-side and Provider-side company relaxed names. Then $$w_c(t_c^i) = \frac{tfidf(t_c^i)}{\sqrt{\sum_{i=1}^{n_c}(tfidf(t_c^i))^2}}$$

$$w_e(t_e^j) = \frac{tfidf(t_c^j)}{\sqrt{\sum_{i=1}^{n_e}(tfidf(t_c^j))^2}}$$

One trivial implementation of the token similarity scoring function is just binary comparison, i.e.

$$s(t_1, t_2) = \begin{cases} 1, & t_1 = t_2 \\ 0, & \text{otherwise} \end{cases}$$

In another implementation, the similarity may be a function of the string edit distance. For example, $$s(t_1, t_2) = \max\left(0, \frac{\text{length}(t_1) - \text{levenshtein}(t_1, t_2)}{\text{length}(t_1)}\right)^{\max(1.0, k-\text{length}(t_1))}$$

where k is a minimum length cutoff and tokens shorter than k characters are penalized more harshly for each character edit. This implementation is suitable for handling small typographical errors in long or complicated words.

In another implementation, $$s(t_1, t_2) = \begin{cases} \frac{\text{length}(LCSubstr(t_1, t_2))}{\text{length}(t_1)}, & LCSubstr(t_1, t_2) \text{ is at the start or end of } t_1 \text{ and } t_2 \\ 0, & \text{otherwise} \end{cases}$$

where $LCSubstr(t_1, t_2)$ gives the longest common substring of $t_1$ and $t_2$. This handles cases where words may be concatenated or split apart, for example "Ever String" versus "EverString".

In another implementation, rather than using only string similarity, the company matching system may consider the semantic similarity of words being compared.

$$s(t_1,t_2)=(\overline{embedding}(t_1)\cdot\overline{embedding}(t_2))^\alpha$$

where $\overline{embedding}(t)$ looks up the semantic word embedding vector for t, and α is a tunable power factor that serves to exaggerate or compress semantic similarity values. This implementation handles cases where two different words are used but may mean the same thing, e.g. "Fred's Fabrics" would be considered similar to "Fred's Textiles" even though "Fabrics" and "Textiles" have very low string similarity. As mentioned previously, the embedding vectors may be pre-generated using Word2Vec, GloVe, PPMI matrix factorization, or other techniques.

In another implementation, the company matching system may also check for similarity in the phonetic representation of each word, rather than the original word themselves. For example, the company matching system may use Soundex, Metaphone, Double Metaphone, or other phonetic keying techniques to create a phonetic code of each word token, and then compute similarity of the phonetic codes. This is useful for comparing names in case data is captured phonetically, e.g. with voice communications over the phone, rather than ambiguity-free, text-based methods.

In other implementations, the company matching system may use a combination of the techniques above, including, but not limited to, the sum, product, max, or power-sum of any of the similarity calculations.

Using these implementations for similarity scoring and weighting functions, the company matching system may compute the relaxed name match score using the generalized match scoring technique described in the previous section. In another implementation, the company matching system may additionally adjust the match scoring to allow higher scores when one string contains an acronym of multiple words in the other string, i.e. by checking the first letter each of a sequence of words.

304: Address Component Match Scores

After normalization, addresses tend to be more standardized than company names, with fewer words being jumbled since the company matching system also parses them into shorter and consistent components.

In one implementation, the company matching system may use the length of the longest common subsequence normalized to the length of the longer string being compared. That is, $$\text{match score} = \frac{\text{length}(LCSubseq(str_c, str_e))}{\max(\text{length}(str_c), \text{length}(str_e))}$$

The longest common subsequence handles cases where the road names are sometimes shortened by removing vowels, e.g. "Windy Ridge" versus "Windy Rdg", but the sequence of kept characters is still in order.

In alternate implementations, the normalization may be against the length of the shorter string, or other functions of the lengths.

For match scoring building name, building number, road name, unit, city, and state, the company matching system may use the longest common subsequence to allow for fuzzy matching. For road type, directional, postcode, country, the company matching system may choose not to allow fuzziness, i.e. the match score is 1 only if the strings match, and 0 otherwise.

In alternate implementations, the company matching system may allow for fuzzy match of postcode if they match on a majority of prefix characters, for countries whose postcodes are organized in a way where nearby postcodes share the same prefix values.

In another implementation, the company matching system may map each address to a geolocation indicated by the longitude and latitude coordinates. Match score between addresses may then be measured using the physical distance between coordinates, normalized against some reference distance or some other function. This handles cases where businesses may have moved offices and assumes that businesses tend to remain in the same general locale when moving.

a match in a hash of the webpage text using, e.g. MD5, SHA-1 or SHA-256 hash functions.

In another implementation, the company matching system may use locality-sensitive hashing techniques, such as SimHash, to generate a hash code for webpage text. Locality-sensitive hashing functions exhibit the property that similar input text hashes to the same or similar hash codes, in the sense that their Hamming distance is small. In this way, the company matching system may assign a high match score if two webpages contain content that hash to two codes with small Hamming distance, e.g. different in only a few bits, since this indicates that they have near-duplicate content. This technique is useful in cases where a company purchases many domain names and puts near-duplicate content on each webpage, rather than redirect to a canonical website.

In another implementation the company matching system may create word count or TF-IDF vectors representing each website based on the webpage text and compute the cosine similarity of the vectors. This allows for a wider range of similarity values from which to generate match scores.

In an alternate implementation, the company matching system may apply Latent Semantic Analysis, Latent Dirichlet Allocation, Paragraph2Vec, or other document embedding techniques to compose a semantic vector for the webpage text, rather than use TF-IDF vectors for computing similarity. This allows for semantic similarity without requiring exact word matches between the two texts.

318-310: Phone and Other Match Scores

For phone and business type fields, the company matching system requires exact match otherwise the match score is set to zero.

312: Overall Match Score

To enable the sorting and ranking of candidate match records, the company matching system forms a single overall score using a list or family of $k_0$ functions on the individual component match scores.

$$\text{overall match score} = \prod_{i=1}^{k_0} (f_i(\text{signature component match scores}))^{\beta_i}$$

$$= \exp\left(\sum_{i=1}^{k_0} \beta_i \, \log(f_i(\text{signature component match scores}))\right)$$

306: Website Match Scores

The match score for comparing two websites may take into consideration the following:

Whether the normalized URLs or domains match

Whether one website redirects to the other

Whether there are links from one webpage to the other and/or vice versa

The similarity of content on the web sites

Websites match with high score if the URLs are the same or if one website redirects to the other. In another implementation, the company matching system may also check if one or both webpages contains a link to the other, as may occur if the two companies are related, e.g. one is a brand or subsidiary of the other company.

If the website URLs are different and there is no redirect, the company matching system may check the similarity of the content to assign the match score. In a trivial implementation, the company matching system may check for exact match of the webpage text itself, or equivalently check for where $k_0$ is the number of composite functions to use and $\beta_i$ is a weighting factor for each function $f_i$.

The family of functions $f_1$ may include, but is not limited to max(relaxed_name_match_score, min_score_0)

max(business_type_match_score, min_score_1)

max(phone_match_score, min_score_2)

max(web_site_match_score, min_score_3)

max(building_name_match_score, min_score_4)

max(max(building_number_match_score, min_score_5), max(building_name_match_score, min_score_6))

max(max(road_name_match_score, min_score_7), max(building_name_match_score, min_score_8))

max(max(road_type_match_score, min_score_9), max(building_name_match_score, min_score_10))

max(unit_match_score, min_score_11)

max(directional_match_score, min_score_12)

max(max(city_match_score, min_score_13), max(postcode_match_score, min_score_14))

max(max(state_match_core, min_score_15), max(postcode_match_score, min_score_16))

max(country_match_score, min_score_17)

Since the overall match score is a product of many factors, tunable min_score_# values are used to limit the effect of any one single poor match. The weighting factors $\beta_i$ control the overall contribution of each component and are also tunable or may be learned given training examples. Note that certain components which contain redundant information may be combined with max pooling. For example, matching on postcode is sufficient and does not require a match on city or state, and in other cases a building name is given rather than a building number, road, and road type.

In general, the matching of relaxed name and city or state are the most important so they are given the highest values for $\beta_i$. Other fields such as website, phone, building number, road name, and country are of medium importance. The least important fields are usually road type, directional, unit, building name (by itself), and business type, since these are often blank or nonexistent.

To tie this back to the entire matching process, once the Provider-side candidate records have been identified for each Client-side record, the candidates may be sorted descending using this overall match score, and the highest scoring candidates may be returned as the matches.

Figure 4:
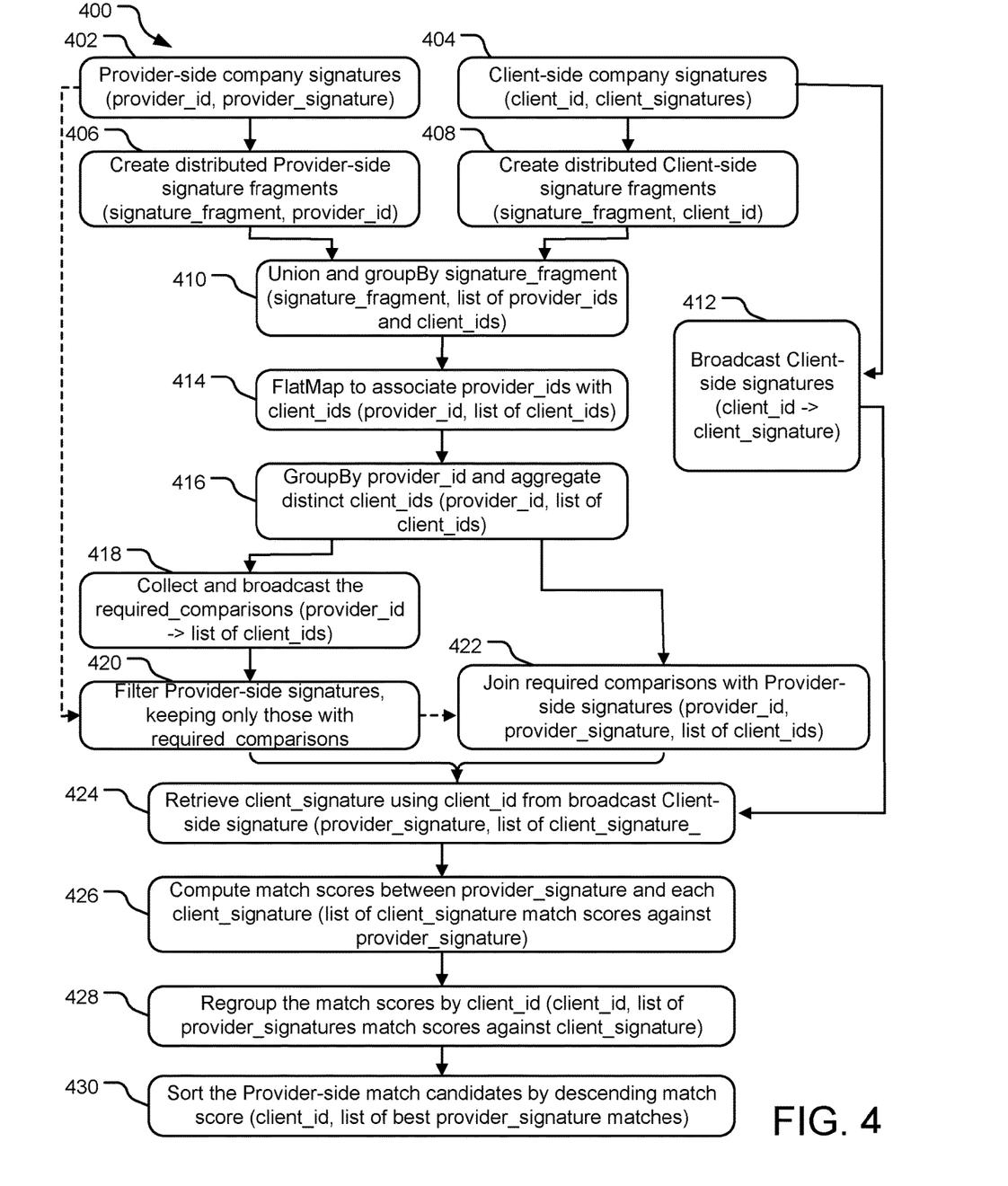
FIG. 4 illustrates example operations for implementing the company matching system disclosed herein.

Implementation of the Distributed System:

FIG. 4 illustrates operations 400 for implementing the company matching system disclosed herein.

The data preparation steps such as normalization, address parsing, and signature fragment generation are naturally parallelizable since the processing of each record may be independent from all other records, and any required reference data may be broadcasted to all workers. Thus, they are implementable using Apache Spark's *.map( ) method of the DataFrame, Dataset, and RDD objects. The word count data preparation steps may also be handled in a standard way using map( ) and reduceByKey( ) functionality.

Because the Client-side dataset of company signatures is typically much smaller than the Provider-side dataset of company signatures, the operation 412 broadcasts the Client-side signatures as a client_signatures lookup table {client_id→signature} since it is small enough to fit comfortably in memory on all the workers, and keeps the distributed Provider signatures dataset in-place to avoid excessive shuffling of data across workers.

To generate the candidates for matching, in one implementation an operation 402 creates a distributed Provider-side dataset of (signature_fragment, provider_id) pairs and a distributed Client-side dataset of (signature_fragment, client_id) pairs where each fragment is paired with the record id that exhibits that signature_fragment. It is typical for each record to exhibit multiple signature fragments. An operation 410 creates a union of the two datasets, and then uses a distributed groupBy( ) on the fragment values, gathering the list of client_ids and provider_ids exhibiting the fragment. For each fragment, after separating the list of client_ids and the list of provider_ids, an operation 414 uses a flatMap( ) or explode to associate each provider_id with the list of client_ids, resulting in a distributed dataset of (provider_id, list of client_ids) pairs. Finally, an operation 416 uses an aggregateByKey( ) or reduceByKey( ) to group by provider_id and concatenate and uniquify the set of client_ids where a comparison against the provider_id record must be made. This results in a dataset of (provider_id, list of client_ids), but now there is only one row for each unique provider_id.

In one implementation, an operation 418 collects this dataset of (provider_id, list of client_ids) as a local lookup table of {provider_id→list of client_ids} and broadcasts it as a metadata table of required_comparisons to each distributed worker. Using the broadcasted required_comparisons table, an operation 422 can filter( ) out the Provider-side records that do not require any comparisons. For the remaining Provider-side records, the list of client_ids for comparison are used to retrieve the client signatures from the broadcasted client_signatures table. At this point, both the Provider-side signature and Client-side signatures are localized in the same worker and match scores may be calculated.

In an alternate implementation, rather than broadcasting, we may perform a distributed join of the dataset of (provider_id, list of client_ids) required comparisons against the distributed Provider-side company signatures, as illustrated by operation 420. This performs a data shuffle, but may be required if the table of required comparisons is too large to broadcast. The list of client_ids for comparison are used to retrieve the client signatures from the broadcasted client_signatures table, as illustrated by operation 424, and similar to before, both the Provider-side signature and Client-side signatures are now localized in the same worker and match scores may be calculated, as illustrated by operation 426.

Once match scores are computed, an operation 428 may perform a groupBy( ) or aggregateByKey( ) on client_id and aggregate the list of all match scores against each Provider-side candidate. Finally, for each client_id group, an operation 430 may sort the candidates by descending match score and keep the top Provider-side matches. This completes the process of matching Client-side records with Provider-side records.

In one implementation, we may first attempt to look up Provider-side records using exact match on Client-side signature components such as name, address, website, phone, or other fields. We may remove exact-matched Client-side signatures from the fuzzy matching procedure since exact match automatically dictates the best match, therefore reducing the overall comparisons and computation needed.

In one implementation, we may cache or memorize the fuzzy match comparisons to save time on repeated or subsequent comparisons of the same two fields or values. Extending this further, we may also cache the lookup results on entire signatures, avoiding the recomputation of fuzzy matching on repeated or subsequent lookups of the same Client-side record.

Figure 5:
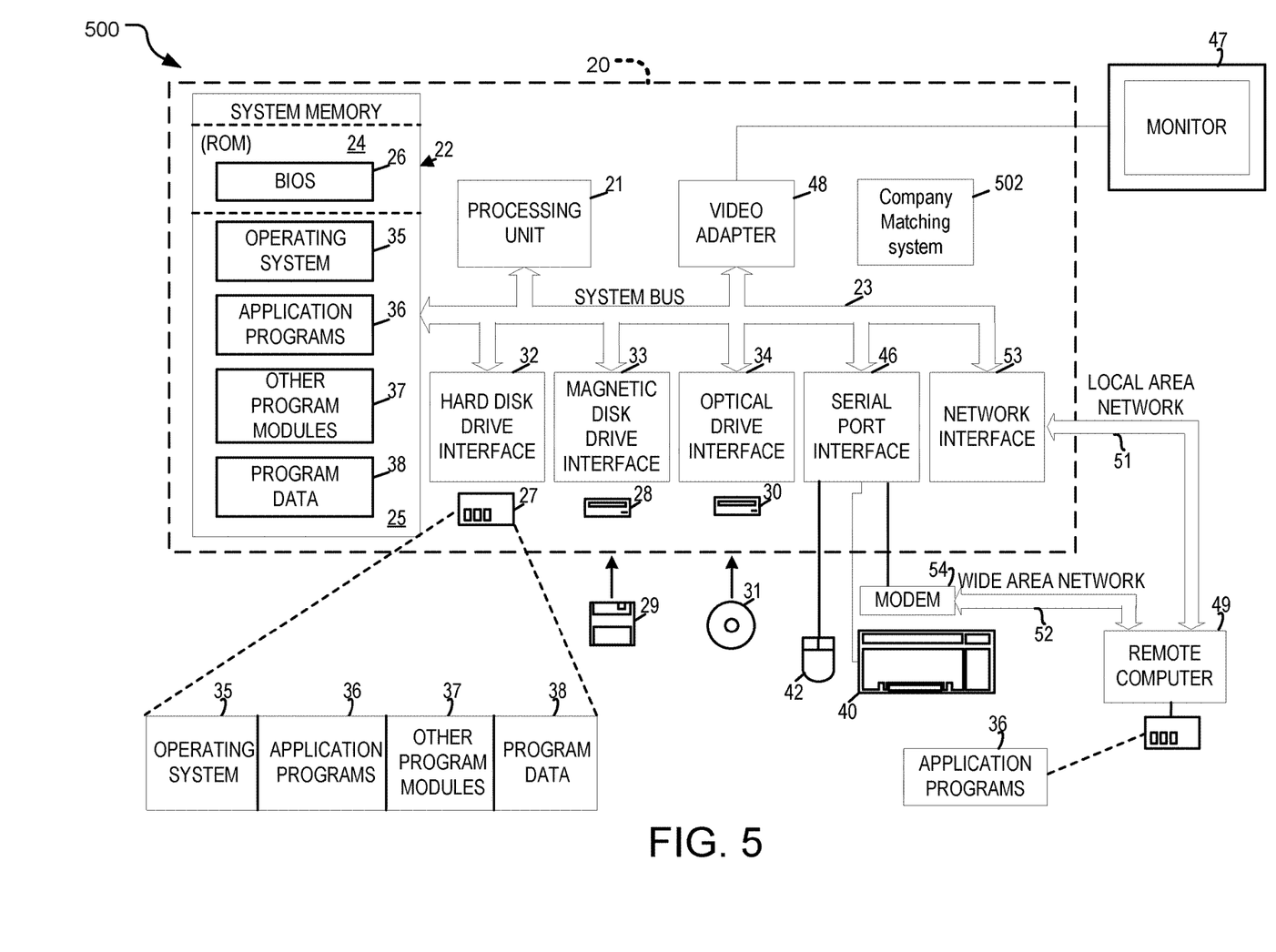
FIG. 5 illustrates an example computing system that may be used to implement the technology disclosed herein.

FIG. 5 illustrates an example system that may be useful in implementing the described predictive analytics technology. The example hardware and operating environment of FIG. 5 for implementing the described technology includes a computing device, such as general purpose computing device in the form of a gaming console or computer 20, a mobile telephone, a personal data assistant (PDA), a set top box, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media which can store data that is accessible by a computer, such as magnetic cassettes, flash memory cards, digital video disks, random access memories (RAMs), read only memories (ROMs), and the like, may be used in the example operating environment. One or more computer instructions for implementing the automated company matching system 502 as disclosed herein may be implemented in one of the memories of the computer 20.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, software or firmware instructions and data for providing a search management system, various applications, search context pipelines, search services, service, a local file index, a local or remote application content index, a provider API, a contextual application launcher, and other instructions and data may be stored in memory 22 and/or storage devices 29 or 31 and processed by the processing unit 21.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized.

Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

Embodiments of the present technology are disclosed herein in the context of an electronic market system. In the above description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features.

In the interest of clarity, not all of the routine functions of the implementations described herein are shown and described. It will, of course, be appreciated that in the development of any such actual implementation, numerous implementation-specific decisions must be made in order to achieve the developer's specific goals, such as compliance with application—and business-related constraints, and that those specific goals will vary from one implementation to another and from one developer to another.

According to one embodiment of the present invention, the components, process steps, and/or data structures disclosed herein may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present technology, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method of matching company names, the method comprising:
receiving a provider side company dataset having multiple provider companies, each of the multiple provider companies having a respective company record;
generating provider side company signature fragments for each of the multiple provider companies based on the respective provider company records;

receiving a client side company dataset having multiple client companies, each of the multiple client companies having a respective client company record;

identify a provider side inexact match candidate based on a comparison of the provider side company signature fragments to the provider company record for at least one of the multiple client companies of the client side company dataset, the provider side inexact match candidate including an overlap of the provider side company signature fragment with the respective client side company record;

for each of the client side companies:
compute a match score for the provider side inexact match candidate;
rank the provider side company the match score, and
generate multiple top matches of the client side companies based on the ranking of the provider side match candidates; and
output the multiple top matches.

2. The method of claim 1, wherein generating the provider side company dataset further comprises:
generating provider company signatures;
generating provider company signature fragments;
generating provider company name tokens;
generating a provider company signature; and
generating the provider side company dataset based on the provider company signature.

3. The method of claim 1, wherein the comparison of the provider side company signature fragments to the client company record for the at least one of the multiple client companies of the client side company dataset includes comparing multiple subsequences of the provider side company signature fragments to respective multiple subsequences of the client side company dataset.

4. The method of claim 3, wherein the multiple subsequences includes comparing two fuzzy subsequences.

5. The method of claim 3, wherein the multiple subsequences includes comparing a fuzzy subsequence and a non-fuzzy subsequence.

6. The method of claim 1, wherein the comparison of the provider side company signature fragments to the company record for the at least one of the multiple client companies of the client side company dataset includes determining a Levenshtein distance.

7. The method of claim 1, wherein the comparison of the provider side company signature fragments to the company record for the at least one of the multiple client companies of the client side company dataset includes determining a cosine similarity.

8. The method of claim 1, wherein the comparison of the provider side company signature fragments to the company record for the at least one of the multiple client companies of the client side company dataset includes determining a Euclidean distance.

9. The method of claim 1, further comprising:
identifying multiple provider side inexact match candidates based on the comparison of the provider side company signature fragments to each of the client company records; and
computing the match score for each of the provider side match candidates based on the multiple provider side inexact match candidates.

10. The method of claim 9, further comprising:
weighting each of the multiple provider side inexact match candidates; and
computing the match score for each of the provider side inexact match candidates based on the weighted multiple inexact match candidates.

11. The method of claim 1, further comprising:
generating client side company signature fragments for each of the multiple client companies based on the respective client company records; and
identifying the provider side inexact match candidate based on a comparison of the provider side company signature fragments to each of the client side company signature fragments.

12. The method of claim 11, further comprising:
identifying multiple provider side inexact match candidates based on the comparison of the provider side company signature fragments to each of the client side company signature fragments; and
computing the match score for each of the provider side match candidates based on each of the provider side inexact match candidates.

13. The method of claim 1, wherein the multiple top matches are output to a remote computing device, network, or server.

14. The method of claim 1, wherein the multiple top matches are output to a display of a user interface.

* * * * *